May 6, 1941.  O. P. LIEBREICH  2,240,792
SELF-ADJUSTING BRAKE
Filed May 16, 1936  2 Sheets-Sheet 1

INVENTOR
O. P. Liebreich

Patented May 6, 1941

2,240,792

UNITED STATES PATENT OFFICE 2,240,792

SELF-ADJUSTING BRAKE

Oscar P. Liebreich, Elmhurst, N. Y.

Application May 16, 1936, Serial No. 80,058

17 Claims. (Cl. 188—152)

This invention relates generally to the improvement of brakes for automotive vehicles but specifically to the self-adjustment of brakes to automatically maintain a constant clearance between the surfaces of the friction material and the brake drum when the brakes are released, to automatically compensate for the wearing off of these surfaces.

Generally, friction means are employed as brakes to retard mass in motion or as clutches to put mass into motion, and such means usually consist of a shoe or disk provided with friction material adapted to be pressed against a friction surface in relative motion. The resulting friction dissipates the kinetic energy of the moving mass by generating heat until relative motion ceases. The power required to press the friction material against the friction surface is represented by the force and the distance through which the force is applied and, since the power available for the application, either manual or otherwise, is usually a limited amount, it is necessary to adjust the clearance between the active friction material and the friction surface to compensate for the wearing away of the friction surfaces.

In the present instance, by way of illustration, I have shown and described my invention as employed in connection with brakes for automotive vehicles, but I wish it to be understood that it is not limited in its useful application to this particular purpose, as it is available for use on brakes, clutches, etc. on machinery and other vehicles where either mechanical or fluid means are used to transmit the required power of application or where self-adjustment is required to maintain at times a constant clearance between two elements.

Brakes for automotive vehicles are made in many forms but usually consist of brake shoes or bands lined with friction material or brake lining adapted to be pressed against a brake drum or disk either by mechanical or fluid means. At present, as the brake lining wears, it is necessary to frequently adjust the position of the brake shoes relative to the drum to maintain a minimum clearance for free movement when the brakes are not applied. This frequent adjustment requires considerable effort and skill and is expensive since, each time an adjustment is made, the vehicle must be held out of service and skilled labor is required. Should the adjustment be neglected or improperly done, the moving vehicle is a menace to life and property and is not safe to operate. Also, when the brakes are out of proper adjustment, the movement of the brake shoes is much greater and there is less power available for the brake application. When auxiliary power is provided such as compressed air, vacuum or electricity, the increased travel requires a greater amount of power for a safe brake application which in turn results in added expense of operation due to premature repairs or replacement of the power units, actuating means, control devices, etc. Furthermore, excessive clearance between brake lining and drum often allows foreign matter to enter with the consequent drum scoring and greatly reduced effective life of the brake lining.

It is well known that the presence of air in a hydraulic brake system reduces its efficiency and is hazardous to safe operation. Extreme precautions are necessary to reduce the possibility of air entering during operation. Heretofore, leakage of air past the wheel cylinder cups was minimized by maintaining a slight pressure in the entire system when the brakes are "off" in order to keep the sealing edges of the cups in contact with the cylinder walls. This was accomplished by the usual two-way check valve in the master cylinder which is spring loaded in a manner to entrap a small amount of fluid in the connecting lines between the master cylinder and the wheel cylinder cups. However, should the action of this check valve become impaired by a tiny particle of grit, scale or other foreign matter, or should leakage occur in the line connections, this slight pressure is destroyed and air can pass by the wheel cylinder cups into the system where it is trapped and seriously interferes with brake effectiveness.

Consequently, such method becomes unstable and inefficient mainly due to the extreme accuracy required in the operation of the check valve, since fluid is returned to the master cylinder only by the tension of the pull-back springs on the brake shoes which, at the instant of their contact with present manually adjustable stops, causes all fluid flow to cease. At that instant there is no further external pressure on the wheel cylinder pistons and cups and therefore the pressure drops rapidly to the slight pressure entrapped by the master cylinder piston return spring against the check valve. Since fluid is practically incompressible, the pressure normally drops to zero as soon as the flow stops, so that the only residual pressure available for spreading the cups is that due to the very slight contraction of the connecting tubing, fittings and other parts of the system. Sould the check valve leak or the slightest leak occur in the system, this slight residual pressure drops to zero or may even become sub-atmospheric, due to a simultaneous return movement of the master cylinder piston, or should the small vent hole become stopped. Should a heavier check valve spring be installed, this detracts from the effective pedal pressure on the system and decrease the efficiency of the brake.

These disadvantages and inadequacies of brakes now in use are entirely obviated for my invention, for I propose to provide a brake which is automatically self-adjusting as the brake lining wears away and one in which a constant free clearance is maintained at all times.

Another purpose of my invention is to provide a brake in which the free clearance is self-adjusting on both fluid and mechnically actuated brakes, either manually or power operated and in accordance with the requirements of varying temperature conditions.

Another object is to provide a brake in which the brake shoes are entirely self-adjusting under all conditions of operation, both to maintain a constant free clearance between lining and drum surfaces when the brakes are released and to automatically align the curved surface of the brake lining to the curvature of the brake drum when the brakes are applied.

Furthermore, in the use of my invention improper brake adjustment is obviated throughout the entire useful life of the brake lining and brake effectiveness is assured with the use of a minimum amount of power at all times, thus eliminating some of the deficiencies and disadvantages of the ordinary brake.

I also propose to provide an improvement in fluid or mechanical actuated brakes which will embrace the desired features of simplicity and efficiency together with economy of cost in production and operation.

With the above objects in view and others which will be detailed during the course of this description, my invention consists in the parts, features, elements and combinations thereof hereinafter described and claimed.

In the accompanying drawings which form a part of this specification and which show several embodiments of my invention as it has been carried out in practice:

Figure 1:
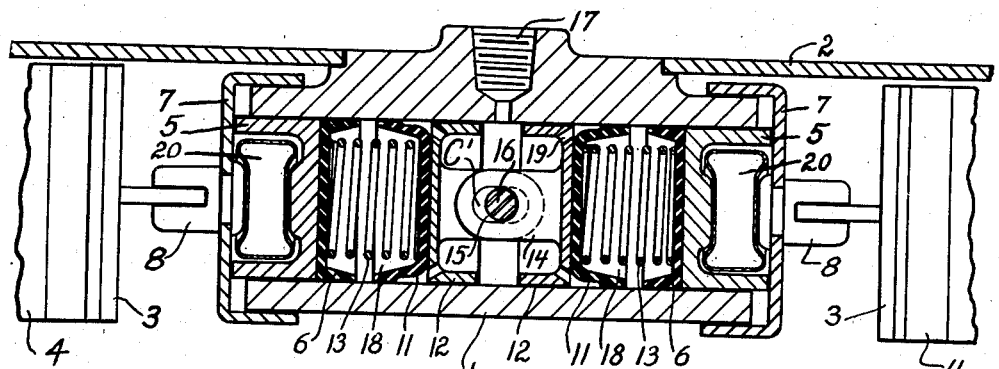
Figure 1 is a plan view partly in section illustrating an application of my invention to the actuating cylinder of a fluid actuated brake.
Figure 2:
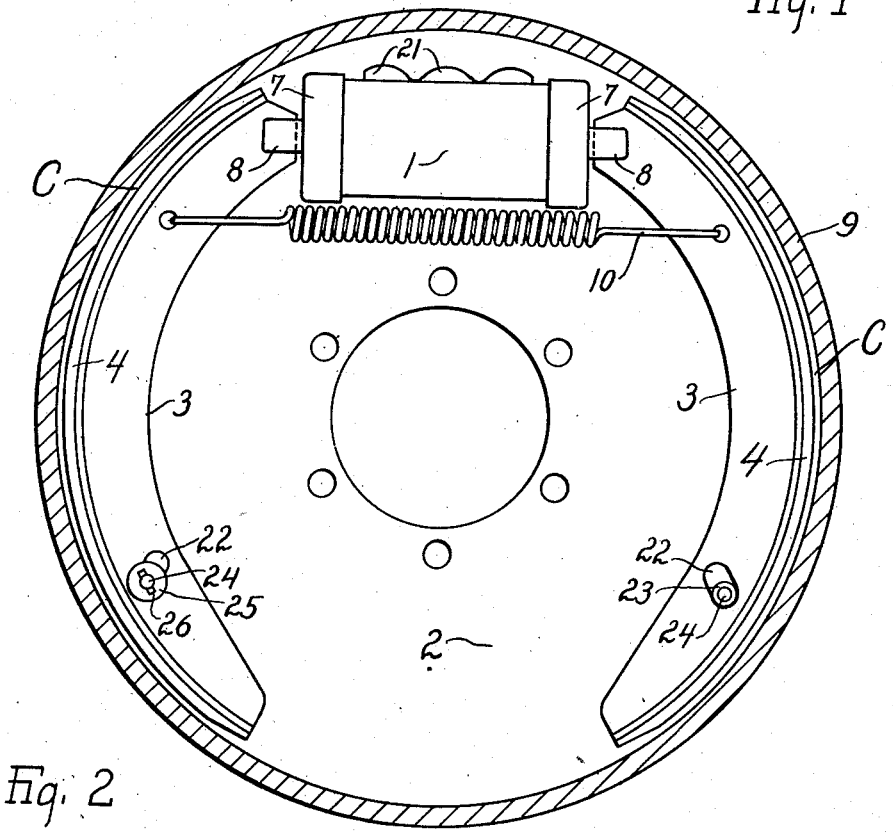
Figure 2 is an elevation illustrating a fluid actuated brake with the brake drum in section.

Referring now to the accompanying drawings in detail, in which like numerals refer to functionally alike parts throughout the several views in which well known and familiar elements such as brake cams, cam shaft bearings, brake fluid, etc., have been purposely omitted for clarity and simplicity in the drawings. In Figures 1 and 2, the wheel cylinder 1 of a fluid brake system is supported by a backing plate 2 on which brake shoes 3 having brake lining 4 are mounted. Wheel cylinder 1 contains the usual brake shoe actuating pistons 5, pressure cups 6 and caps 7 with studs 8 bearing on shoes 3.

Ordinarily, as fluid pressure is exerted on cups 6 the brake shoes are forced into frictional engagement with brake drum 9, and when the pressure is relieved, pull back spring 10 forces fluid out of the cylinder and the shoes return to their original "off" position. As the brake lining 4 wears away, and since the brake shoes return to their original position, additional fluid is required at each application to force the pistons out to engage the lining with the drum surface, until such time as a manually adjusted stop is set to prevent the full return of the brake shoes. Since this manual adjustment must of necessity be made at infrequent intervals and since it is impractical to perform such a manual adjustment after each brake application to compensate for the minute amount of lining which may have been worn off, the free clearance between lining and drum when the brakes are released is constantly varying and often is excessive and more movement of the brake shoes is required than is actually necessary. Since power is a function of force and distance, the effective power is gradually reduced and the efficiency of the brake system is not constant.

In order to provide a constant free clearance C, Fig. 2, it is necessary to provide means to constantly check the return movement of the brake shoe after each brake application to automatically compensate for lining wear and thus provide self-adjusting means or a self-adjusting brake.

As shown in Fig. 1, I provide a reverse acting pressure cup 11 in front of cup 6 together with piston 12. Spring 13 holds each cup against its respective piston. In addition, piston 12 is provided with an extension 14 provided with a slotted opening 15 through which a stop is provided in the form of a pin 16, whereby the movement or travel of piston 12 is defined and limited in both directions. In Fig. 1, I have shown a separate set of pistons and cups for each brake shoe, although if the wheel cylinder is moveably mounted on the backing plate or if only one brake shoe is to be actuated, it is quite obvious that only one set of moveable cylinder elements may be used with the cylinder otherwise closed at one end.

In operation, and with the cylinder filled with a relatively incompressible fluid such as oil or brake fluid, to make a brake application, fluid is forced into cylinder 1 through opening 17. Pistons 12 are moved outward together with cups 11 and, since space 18 between cups 6 and 11 is also filled with an incompressible fluid, cup 6 will force piston 5, cap 7, stud 8 and brake shoe 3 outward and frictionally engage lining 4 with drum 9 and apply the brake. Piston 12, however, can move only the amount permitted by slotted opening 15 and stop 16, at which time the brake should be fully applied.

In the event some of lining 4 has become worn off, piston 12 and cup 11 will be restrained from further movement by stop 16, but fluid can readily pass through holes 19 in piston 12, past cup 11 and into space 18 by forcing the sealing surface of cup 11 inward. This additional fluid will cause further movement of piston 5 and fully apply the brakes.

To release the brakes, fluid is returned through opening 17 at which time the brake shoe pull back spring will force the moving elements of cylinder 1 inward, but only an amount permitted by slotted opening 15 and stop 16 since, as piston 12 comes to rest against stop 16, sealing cup 11 moving with piston 12 acts as a fluid check valve in the reverse direction and retains all the fluid in space 18. Thus, the return of the released brake shoes is definitely limited to the predetermined clearance C' in opening 15, which is just sufficient to provide the necessary free clearance C between the lining and the drum. As more lining is worn away, additional fluid will pass into space 18 to retain the brake shoes in the correct position relative to the drum and automatically provide a constant free clearance and cause the brakes to be self-adjusting at all times.

In the event of prolonged brake applications in which the heat generated is sufficient to cause the brake drum to expand, I provide a thermal element 20 which, on becoming heated by the rising temperature within the brake drum and by the heat flowing into stud 8 from the brake shoes, automatically moves cap 7 away from piston 5 to move the brake shoes an additional amount to compensate for the increased diameter of the expanded drum. Otherwise, by the very close free clearance which my invention provides, there may be a tendency to over adjust the brake shoes which might cause dragging brakes after the drum has cooled and has again returned to its normal diameter. The thermal element 20 shown consists of a thin metal container filled with mercury or other volatile substance, although other types of thermal elements may be used.

From Fig. 1 it will become clear that the brake shoe actuating piston or pistons 5, and piston or pistons 12 serving for the automatic adjustment of pistons 5 to compensate for the wear of the shoe lining, are all housed in a common cylinder and are aligned with one another. Furthermore, it will be seen that automatically operable thermostatic means 20, designed to compensate for dimensional changes of the friction elements of the brake induced by heat, and thereby preventing over-adjustment of pistons 5 by pistons 12, are aligned with these pistons and are disposed between pistons 5 and the actuated ends of brake shoes 3.

My improved self-adjusting brake is illustrated in further detail in Fig. 2 in which the self-adjusting wheel cylinder 1 is shown with the usual provision for bleeding air out of the fluid system at 21. Brake shoes 3 are retained and guided by curved slot 22 which moves on roller 23 mounted on anchor stud 24. Spring washer 25 and cotter 26 further retains shoe 3 and prevents vibration. As the brakes are applied, the moving elements in wheel cylinder 1 presses the brake shoes against the brake drum, the shoes moving downward and outward as guided by curved slot 22, thus allowing each brake shoe to automatically center itself in the drum with practically equal pressure over the entire area of the brake lining. Curved slot 22 provides a certain amount of servo action to assist in braking, the degree of servo action being variable by alternating the inclination or radius of curvature of the slot.

Figure 3:
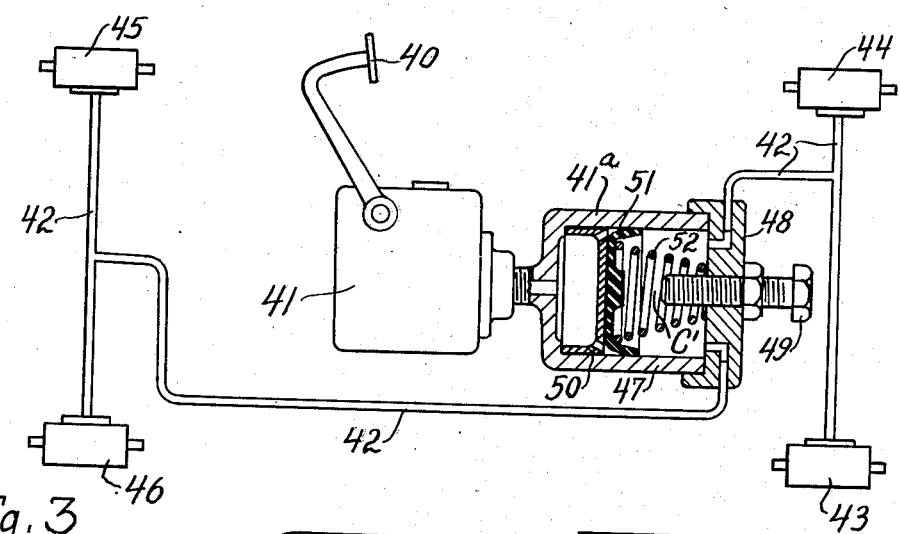
Figure 3 is a sectional view of one embodiment of my invention illustrating its application to a fluid brake system.

Fig. 3 illustrates the application of the one-way check and the preset clearance to the usual fluid brake system having brake pedal 40, master cylinder 41, clearance-check unit 41a connected by means of fluid lines 42 to ordinary wheel cylinders 43, 44, 45 and 46. Clearance-check unit 41 consists of a cylinder 47 having a closed end attached to the pressure outlet of master cylinder 41 and the other end fitted with a tight cap 48 provided with fluid outlets and clearance adjusting screw 49. Similar to wheel cylinder 1 of Fig. 1, cylinder 47 is provided with piston 50, pressure cup 51 and spring 52. Adjusting screw 49 is set to provide clearance C' between cup 51 and the end of screw 49 sufficient to allow enough fluid displacement to provide for free clearance on all wheel cylinders and their brake shoes.

It should be quite obvious that one of these automatic brake adjusting units may be used to control the front brakes and one for the rear brakes, or a separate unit may be installed to independently control each wheel unit, especially on existing fluid brake installations.

Figure 4:
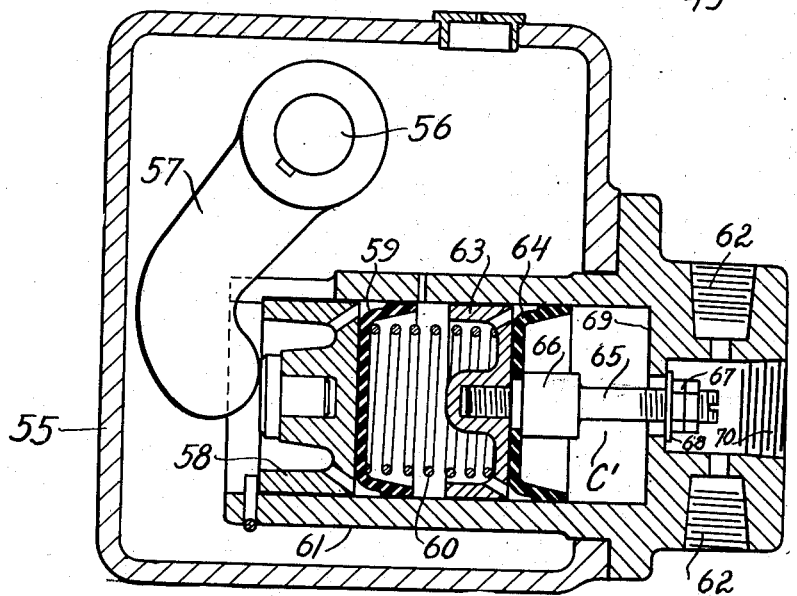
Figure 4 is a sectional elevation of a master cylinder for a fluid brake system and illustrating an application of my invention thereto.

A further adaptation is illustrated in Fig. 4 which shows the one-way check and set clearance built into a compensating type master cylinder for fluid brake systems. The supply tank 55 carries a supply of brake fluid and is provided with a brake shaft 56 connected to a brake pedal in the usual manner, and an inside brake lever 57 which actuates a piston 58, pressure cup 59 and return spring 60 in master cylinder 61 having fluid outlets 62. A second piston 63 and pressure cup 64 adapted to operate cylinder 61 are provided with threaded stud 65 having stop collar 66, adjusting nuts 67 and stop washer 68.

With the fluid brake system in operation, movement of brake arm 57 actuates the moving elements in the master cylinder and forces fluid out of outlets 62 to apply the brakes. Cup 64 forces the fluid out ahead of it until stop 66 contacts the end 69 of cylinder 61. As wear takes place on the brake lining and additional fluid is required, cup 59 forces fluid past cup 64 without in any way interfering with the brake application.

When the brakes are released by return of lever 57 and the moving elements in the master cylinder, cup 64 will return only the amount permitted by stop 68 and thus permit the return of only sufficient fluid from the connecting lines and wheel cylinders to provide free clearance between the brake lining and the drum surfaces. Cup 64 acts as a one-way fluid check valve to retain sufficient fluid in the brake system to hold all the brake shoes in adjustment, the amount of clearance being set by adjusting nuts 67 and cup travel C'. Pressure opening 70 is adapted to receive the usual stop light switch commonly used on hydraulic brake systems.

The heretofore used two-way master cylinder check valve is not required in the present hydraulic brake system since the fluid retained ahead of the adjuster cup 64 (Fig. 4) is definitely and positively held by stop nuts 67 against the full force of the brake shoe pull-back spring, which results in a considerable super-atmospheric fluid pressure in the wheel cylinders to obviate the possibility of air entrance. Should a slight leak occur, there is no material diminution in the retained fluid pressure, and the passage of air at atmospheric pressure is definitely prevented. Likewise, master cylinder 41 of Fig. 3 is without a check valve, fluid pressure being retained by cup 51 of the attached adjuster unit 41a.

In other words, contrary to the heretofore employed practice of providing a sensitive and not dependable double-acting check valve in the master cylinder, I utilize in connection with piston 50 a cup 51 (Fig. 3) or with piston 63 a cup 64 (Fig. 4), which cups are rugged, and therefore may be relied upon to perform faultlessly under all conditions, since their correct function remains unaffected even by the presence of foreign matter. Together with their respective pistons, these cups may be considered in a broad sense one-way check valves, which permit fluid to pass through appropriate ports at the edges of the pistons, and past the periphery of the cups, into the system, when the brake lever is operated. At that moment the pistons move inward. As the brake lever is released, the pistons are caused to move in the opposite direction, outwards, however, when the pistons reach the limit of their travel, their cups become seals and entrap the fluid now completely filling the closed system between the cups and pistons 12 of the wheel cylinders.

In the preferred form of my invention shown in Fig. 1, fluid is retained between outer cups 6 and inner cups 11 of the wheel cylinder under the full force of pull-back spring 10 resulting in a high super-atmospheric pressure against the sealing edges of the cups but in no way detracting from the effective pedal pressure on the fluid, and resulting in a greater efficiency than present hydraulic brake systems. Furthermore, lighter pull-back springs may be used with resulting easier operation and increased pedal effectiveness.

In operation, when the brakes are released, cups 11 return to their "off" position against a stop, limiting the movement of piston 12, and, since there is no check valve in the master cylinder, the brake system returns to zero pressure, but remains entirely filled with fluid by the atmospheric pressure on the fluid in the vented master cylinder. This definitely eliminates the hazards of possible leaks in the system, and should additional fluid be required by the system, same is supplied by the master cylinder in the usual manner through passages provided in pistons 50 and 63 (Figs. 3 and 4).

In practice, it is found that it is necessary to bleed the air from only the space between cups 6 and 11, the initial air in the system and in the space between pistons 12 being automatically fed past cups 11 and out through the bleeder openings. When initially filling the system with fluid, cups 6 act as the discharge valves of a pump so that the fluid is pumped by the master cylinder in the usual manner.

In the event it is desired to use the advantages of this hydraulic brake system without the self-adjusting feature, stop 16 may be omitted and a spring provided between pistons 12 of less tension than brake shoe pull-back spring 10 so that it will serve as an accumulator to exert sufficient pressure on the fluid between cups 6 and 11. The piston and cup units are then free to float in the common double ended cylinder when used to actuate brake shoes of the "two-shoe servo" type, caps 7 alternately acting as anchors for forward and reverse rotation respectively. When used in the usual type of brake, a suitable stop may be provided to centralize pistons 12, or with stepped cylinder construction the offset in the cylinder wall thus formed may be utilized as a stop for the larger piston. It has been found in practice that the entire arrangement shown in Fig. 1 may be installed in a cylinder of the same overall length as wheel cylinders now commonly used, so that they are interchangeable.

While I have herein shown and described one particular embodiment of my invention as applied to self-adjusting brakes, I wish it to be understood that I do not limit myself to all the precise details herein set forth by way of illustration, as modification and variation may be made without departing from the spirit of the invention or exceeding the scope of the appended claims.

What I claim is:

1. A friction brake comprising a brake drum, a brake shoe movable toward and from said drum, means for actuating said shoe into frictional engagement with said drum, and combined automatic fluid means and automatic thermostatic means, the latter responsive to the heat generated by friction between the shoe and drum, and being directly associated and aligned with said shoe actuating means, said combined means serving for limiting the movement of said shoe away from the drum to maintain a constant predetermined free clearance between shoe and drum to compensate for wearing away of the friction elements of the brake and for maintaining them at a desired relation when such relation becomes altered through frictional heat.

2. A friction brake comprising a brake drum, a brake shoe movable toward and from said drum, means for actuating said shoe into frictional engagement with said drum, fluid limiting means to maintain a constant free clearance between said shoe and drum as wear takes place between the friction elements of the brake and when said shoe actuating means is inactive and automatic adjusting means responsive to heat generated by said frictional engagement between the brake shoe and the drum, said automatic adjusting means being aligned and directly associated with and constituting a part of said shoe actuating means.

3. A friction brake comprising a brake drum, a brake shoe movable toward and away from said drum, means for actuating said shoe into frictional engagement with said drum, and means for limiting the movement of the shoe away from the drum to normally provide a constant free clearance between shoe and drum when said shoe actuating means is inactive, said shoe movement limiting means comprising an automatic fluid trap aligned with and forming a part of said shoe actuating means and being constructed and arranged for automatically adjusting said shoe actuating means for maintaining the aforesaid clearance between the friction elements of the brake, and thermostatic means, directly associated and also aligned with said shoe actuating means, for compensating for and responsive to heat effects induced by friction between the brake elements, said thermostatic means being adapted to move said shoe and to prevent an excessive adjustment of said shoe actuating means by said shoe movement limiting means.

4. A brake having friction elements comprising a fluid actuated brake shoe cooperative with a brake drum, a hydraulic piston for actuating said brake shoe into frictional engagement with said drum, a second hydraulic piston cooperative with said first mentioned piston and limiting the movement of it to maintain a predetermined clearance between said friction elements when said brake shoe is in inactive position and means associated between said brake shoe and said first mentioned piston, comprising thermostatic means responsive to the heat generated by the engagement of said frictional elements.

5. A fluid brake having fluid self-adjusting means to compensate for wear due to friction, and thermostatic adjusting means to compensate for the effect of heat resulting from said friction, said fluid brake including a shoe actuating piston, said fluid self-adjusting means including a floating piston in cooperation with said actuating piston, both pistons being aligned and operating in a common cylinder, said thermostatic means being directly associated with and forming a part of said actuating piston.

6. A brake comprising a brake drum, a pair of brake shoes, a fluid pressure actuator to apply said shoes, fluid pressure automatic wear adjusting means located within said actuator, and means for automatically preventing over adjustment, due to heat effects, interposed between the brake shoes and the fluid pressure actuator.

7. A brake comprising a brake drum, a brake shoe, an actuator arranged to apply said shoe, and thermostatic means responsive to the heat generated by the application of said shoe, and interposed between the actuator and said shoe, in a manner to maintain the applying force of said actuator to said shoe independently of movement of said actuator.

8. A brake comprising a brake drum, friction means, hydraulic applying means for said friction means, hydraulic automatic adjusting means for said applying means, and thermostatic means between said friction means and said applying means, responsive to the heat generated by said frictions means, said thermostatic means being adapted to prevent over-adjustment of said applying means by said adjusting means.

9. A fluid operated braking system comprising a master piston, a brake shoe, a pull back spring for said brake shoe, a brake-actuating piston and a floating piston having a limited stroke and being interposed between the master piston and the brake-actuating piston, said floating piston having an annular seal arranged to pass fluid to said actuating piston when the brakes are applied, and to otherwise retain fluid under pressure between said actuating piston and said floating piston, said pressure being maintained by said pull back spring, and means associated between said brake shoe and said actuating piston, comprising a thermostatic element responsive to the heat generated by the engagement of said shoe.

10. A brake comprising a drum, friction means associated with said drum, an applying means and fluid pressure means for adjusting the friction means to compensate for wear, said applying means and said fluid pressure means coaxially located in a common cylinder disposed in said drum, and means interposed between said applying means and said friction means responsive to the heat generated by said friction means for limiting said adjustment.

11. A friction brake system comprising friction elements and an actuator for one of said friction elements, and heat responsive automatic adjusting means positioned between said actuating means and one of said friction elements and capable of transmitting engaging force to move said friction element independently of further movement of said actuator.

12. A brake system having friction elements comprising a brake shoe and a brake drum, an actuator for moving said brake shoe into frictional engagement with said drum, wear adjusting means for one of said friction elements, and means positioned between said brake shoe and said actuator comprising thermostatic means responsive to the heat generated by the engagement of said friction elements for expanding the shoe toward the drum independently of movement of said actuator.

13. A fluid operated braking system having means for placing fluid under pressure and brake actuating means responsive to said pressure, a floating piston having a limited stroke and interposed between the means for placing fluid under pressure and the brake actuating means, said floating piston having two-way limiting means for both directions of axial travel and an annular seal whereby fluid passes to said actuating piston to effect an automatic brake adjustment when the brake is applied and is otherwise retained between said brake actuating piston and said floating piston to maintain said adjustment, and means for limiting the degree of said automatic adjustment.

14. In a friction device having engageable friction elements, an actuator for engaging said elements, and thermostatic means responsive to heat generated by the engagement of said elements positioned between said actuator and one of said elements to maintain the engaging force of said actuator independently of further movement of said actuator.

15. A fluid operated braking system having a master piston to provide fluid pressure and a brake actuating piston responsive to said fluid pressure comprising a floating piston having a limited stroke and interposed between the master piston and the brake-actuating piston, said floating piston having two-way limiting means for both directions of axial travel positioned on a side away from said brake actuating piston, and having an annular seal whereby fluid passes to said actuating piston to effect an automatic brake adjustment when the brake is applied and is otherwise retained between said brake actuating piston and said floating piston to maintain said brake adjustment, and means for preventing over adjustment of said automatic brake adjustment.

16. In a fluid brake system comprising a drum, friction means cooperative with said drum, actuating means located in said drum and fluid pressure adjusting means for adjusting the friction means to compensate for wear, said actuating means and said adjusting means cooperative in a common cylinder and said adjusting means comprising an annular piston seal cooperative with the bore of said cylinder and arranged to by-pass fluid in one direction, and thermostatic means responsive to heat generated by said friction means, disposed in alignment with said pistons and between said adjusting and friction means.

17. A fluid operated braking system comprising a brake drum, a pair of brake shoes, a pull back spring for said shoes and an operating wheel cylinder, all positioned within said drum, said wheel cylinder containing two aligned brake shoe actuating units each comprising a floating piston in operative engagement with one of said shoes and a second floating piston coaxial with the first mentioned piston and having means for limiting its stroke in each direction, said second floating piston having an annular piston seal arranged to pass fluid to the first piston when the brake is applied and to otherwise retain fluid between both pistons under pressure responsive to said pull back spring, and means associated between said brake shoe and said first mentioned piston comprising a thermostatic element responsive to the heat generated by the engagement of said shoe with said drum.

O. P. LIEBREICH.